(12) United States Patent
Jamadar et al.

(10) Patent No.: US 12,263,612 B2
(45) Date of Patent: Apr. 1, 2025

(54) METHOD AND DEVICE FOR CUTTING ELECTRODE FOILS

(71) Applicant: VOLKSWAGEN AKTIENGESELLSCHAFT, Wolfsburg (DE)

(72) Inventors: Kartik Jamadar, Wolfsburg (DE); Priyanka Gangurde, Nashik (IN)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 345 days.

(21) Appl. No.: 17/865,780

(22) Filed: Jul. 15, 2022

(65) Prior Publication Data
US 2023/0021255 A1   Jan. 19, 2023

(30) Foreign Application Priority Data
Jul. 16, 2021   (DE) ............ 10 2021 118 458.4

(51) Int. Cl.
*H01M 4/04* (2006.01)
*B26F 3/00* (2006.01)

(52) U.S. Cl.
CPC ........... *B26F 3/004* (2013.01); *H01M 4/04* (2013.01)

(58) Field of Classification Search
CPC ......... B24C 1/045; B24C 5/005; B24C 3/322; B24C 3/088; B26F 3/004; B26D 7/086
(Continued)

(56) References Cited

U.S. PATENT DOCUMENTS 2,774,194 A * 12/1956 Thatcher ............... B28D 5/047
                                                   451/37
3,241,265 A *  3/1966 Wing .................... B24C 1/045
                                                   451/78

(Continued)

FOREIGN PATENT DOCUMENTS

CN   101835561 A   9/2010
DE   2 329 932 A2  1/1975
(Continued)

OTHER PUBLICATIONS

Search Report for Chinese Application No. 202210817664.1, dated Nov. 12, 2024.

*Primary Examiner* — Jennifer S Matthews
(74) *Attorney, Agent, or Firm* — PEARL COHEN ZEDEK LATZER BARATZ LLP (57) ABSTRACT

A method for cutting electrode foils (1) by means of a particle stream (2) is proposed. A cutting device (4) for cutting electrode foils (1) that are intended for use in a battery cell is also specified which comprises at least one nozzle (5) with an outlet (6), one cutting tool (7), one vibration device (8) for exciting at least the cutting tool (7) to vibration (14), one particle feed line (9) for supplying at least particles (13), and one gas feed line (10) for supplying a first gas stream (12), wherein the particles (13) and the first gas stream (12) can be mixed in the cutting device (4) to form a particle stream (2) and fed via the nozzle (5) to the outlet (6), wherein the cutting tool (7) and the outlet (6) can be arranged above the electrode foil (1) with separation (11) from a surface (3) of the electrode foil (1), and wherein the electrode foil (1) can be cut at least as a result of the particle stream (2) and the vibrations (14) of the cutting tool (7).

14 Claims, 6 Drawing Sheets

(58) Field of Classification Search
USPC .................................................. 451/165, 910
See application file for complete search history.

(56) References Cited

U.S. PATENT DOCUMENTS

| | | |
|---|---|---|
| 6,379,858 B1 | 4/2002 | Perry et al. |
| 2011/0124270 A1 | 5/2011 | Liwszyc et al. |
| 2013/0298387 A1 | 11/2013 | Kobier et al. |
| 2017/0151650 A1 | 6/2017 | Miller |

FOREIGN PATENT DOCUMENTS

| | | | | |
|---|---|---|---|---|
| DE | 102019200419 A1 | * | 7/2020 | |
| FR | 3061055 A1 | * | 6/2018 | ............... B24C 1/08 |
| GB | 663979 A | | 1/1951 | |
| JP | H06143099 A | * | 5/1994 | |
| JP | 2009-274181 A | | 11/2009 | |
| WO | WO-2014200393 A1 | * | 12/2014 | ........... B29C 70/342 |

* cited by examiner

METHOD AND DEVICE FOR CUTTING ELECTRODE FOILS

CROSS REFERENCE TO RELATED APPLICATION

This application claims priority from German Patent Application No. 10 2021 118 458.4, field Jul. 16, 2021, which is hereby incorporated by reference in its entirety.

FIELD OF THE INVENTION

The invention relates to a method and device for cutting electrode foils, particularly coated electrode foils.

Batteries, and particularly lithium-ion batteries, are increasingly being used to drive motor vehicles. Batteries are typically assembled from cells, with each cell having a stack of anode, cathode, and separator foils, possibly in the form of strata or material layers. At least some anode and cathode foils are embodied as electrical current collectors for diverting the current provided by the cell to a consumer arranged outside the cell. The individual elements of a stack will also be referred to hereinafter as electrodes or foils.

The individual foils are provided particularly as a continuous material, are optionally coated, e.g., with an active material, and are at least partially trimmed. Uncoated regions of coated foils can be used as collectors.

When cutting electrodes, the following cuts are performed:
Slitting: The cutting line extends along the extension (x direction) of the continuous material so as to divide the wide starting material into a plurality of narrower strips of continuous material;
Notching: The collectors are formed from the continuous material with the cutting line; the cutting lines extend longitudinally and transversely to the extension of the continuous material;
Cutting: The cutting line is transverse to the extension of the continuous material; as a result of the cutting, the electrode foils are cut off from the continuous material and the individual layers of the stack are formed.

The current state of the art in cutting lithium-ion battery electrodes utilizes the shearing principle, according to which an upper blade (above a layer to be cut) comes into contact with a lower blade (below a layer to be cut). The contact leads to high friction and thus to faster tool wear. Slitting at high speeds exacerbates this problem. For this reason, the cutting speed is currently limited to a maximum of 120 m/min [meters/minute].

Slitting is performed particularly by upper and lower tungsten carbide circular blades. These blades need to be resharpened after approximately 200 km [kilometers] of cutting line. Such frequent regrinding of the blades results in high operating costs.

Notching and cutting are performed particularly as separate operations after slitting. This is done either mechanically or by laser. The use of separate machines for slitting and notching entails greater investment and space requirements.

Laser cutting is an energy-intensive process (~6 kW [kilowatt] power requirement of the system) and creates a heat-affected zone. The active material of the coated electrode in the heat-affected zone is burned, reducing the battery capacity. The laser process is also inefficient, because most of the concentrated light rays are reflected off the copper or aluminum surface of the electrode. In particular, a special green laser is needed in order to achieve better light absorption. However, this type of laser is expensive and does not allow speeds of greater than 80 m/min.

Mechanical notching results in high tool wear. In addition, the advancement of the electrodes must be stopped at regular intervals in order to carry out the method step. This results in reduced cutting speeds. The movement of the electrode in the z direction (thickness direction) during the slitting process causes ripple to occur at the slit edge or cutting line. It is not possible to control this ripple because there is no counter tool.

In particular, there is no provision for limiting the movement of the electrodes in the y direction (width direction). This results in ripple in the y direction.

Due to the lack of a counterforce when slitting and mechanically notching, burrs can form. In particular, this can result in a short circuit in the battery cell. Active material of the cut electrode can get caught on the cutting edges. This requires extensive cleaning of the cutting edge as well as of the blade. Adhesion of particles larger than 10 μm [microns] to the cutting edges can also cause a short circuit in the battery cell.

In short, cutting with the tool (mechanical cutting) and/or cutting with energy (laser) can result in reduced cutting speed, increased cost, reduced battery capacity, and/or reduced battery cell safety.

These drawbacks could be mitigated as follows:
Extensive cleaning of the cut edge when cutting with a solution of alcohol and paraffin oil;
Cleaning the cutting edge during mechanical cutting by means of contact and contactless cleaning; in contactless cleaning, ionized air is blown onto the cutting edge in order to neutralize static on non-conductive particles; such neutralized particles can then be blown off or suctioned off;
Use of a green laser, because it has the lowest reflection from the metallic surface of the electrode;
Reducing the cutting speed so that tool wear can be reduced;
Softening of the tolerance of the cutting edge (in terms of allowable burr size and particle adhesion), but that reduces battery safety.

The primary drawbacks of known systems that are in use are as follows:
High wear of the slitting blade; it must be reground every 200 km; tungsten carbide and other hard metals and ceramics as tool material reduce this wear rate but are very expensive;
An extensive cleaning station is required when cutting; an electrode cleaning station may be required after slitting and laser cutting in order to remove particulate contamination from the electrode; this increases the cost, cycle time, and/or space requirements of the machine;
Mechanical longitudinal cutting (slitting) is very sensitive to cutting parameters such as cutting angle, cutting speed, force between upper and lower blade, blade surface roughness, and machine vibration; minor changes lead to burr formation and additional particle contamination;
There is currently no viable solution for continuous notching and cutting; this means that the movement of the electrode is temporarily halted during notching and cutting; this reduces the speed of notching and cutting; the maximum speed for notching and cutting is 60 m/min.

The following techniques are known to overcome some of the drawbacks mentioned:

Using hard material such as high chromium steel, ceramics, and tungsten carbide as tool material in order to reduce wear;

The smallest radius when notching is set to 2 mm [millimeters]; it is not possible to achieve a smaller radius between two cutting edges (at the intersection of longitudinal and cross section);

Continuous movement of the electrode during notching and cutting can only be carried out by a few manufacturing specialists; this means that the laser gun travels at an angle while cutting so that the final trimming cut is "perfectly" straight; this requires very precise control of the travel path of the laser gun and electrode;

Use of various cutting principles such as rotary cutting for slitting and notching; with rotary cutting, the quality of the cross section is inferior to that achieved with longitudinal cutting;

Using a high-powered (6 kW) green laser to cut the anode;

When laser-cutting the electrode, a cooling plate is used in order to achieve rapid cooling and reduce the heat-affected zone.

As a result, cutting the battery electrode with mechanical tools or with energy (laser) is still an error-prone, tolerance-heavy, expensive, and/or unreliable process.

A device for processing surfaces by honing is known from U.S. Pat. No. 6,379,858 B1. A honing medium is propelled at the surface of the material to be processed via a sonic horn. Alternatively, the honing compound is placed on the surface and a tool is excited to vibration and contacts the surface via the honing compound.

A method for manufacturing panels using an ultrasonic horn as a processing tool is known from DE 2 329 932 A2.

A polishing device for processing surfaces is known from JP 2009-274181 A. A nozzle via which a polishing compound is applied to the surface is excited to vibration.

It is the object of the present invention to at least partially solve the problems described herein with reference to the prior art. In particular, a method and device for cutting electrode foils are to be proposed with which a high-quality cut can be achieved at high speed and with as little wear as possible.

A method and a cutting device with the features with the features of the independent claims contribute to the achievement of these objects. Advantageous developments are the subject of the dependent claims. The features listed individually in the claims can be combined in a technologically meaningful manner and supplemented by explanatory facts from the description and/or details of the figures, with additional design variants of the invention being indicated.

The method for cutting electrode foils that will be elucidated below makes a contribution to this end. The electrode foils are intended particularly provided and/or specified for use in a battery cell. The method is carried out with at least one cutting device. The cutting device comprises at least the following components: a nozzle with an outlet, a cutting tool, a vibration device, a particle feed line, and a gas feed line. The cutting is carried out by a particle stream, i.e. by applying the particle stream to the electrode foil. The cutting is additionally effected by a vibration of the cutting tool, with the cutting tool contacting the electrode foil via at least one particle of the particle stream that is interposed between the cutting tool and the electrode foil.

The method comprises at least the following steps:
a) Providing an electrode foil with a surface;
b) Arranging the outlet over the electrode foil with separation from the surface;
c) Introducing a first gas stream from the gas feed line into the cutting device,
d) Introducing at least particles from the particle feed line into the cutting device,
e) Mixing the first gas stream and at least the particles in the cutting device into the particle stream;
f) Exciting at least the cutting tool or, additionally, the nozzle to vibration by means of the vibration device;
g) Applying the particle stream emerging from the outlet to the electrode foil, whereby the electrode foil is cut; and
h) Applying the vibrations of the cutting tool to the electrode foil via at least one particle that is interposed between the cutting tool and the electrode foil, whereby the electrode foil is cut.

The above (non-exhaustive) breakdown of the method steps into a) through h) is primarily intended to serve purposes of distinction and not to impose any order and/or dependency. The frequency of the method steps can also vary. It is also possible for method steps to overlap temporally at least in part. Steps c) to h) very especially preferably take place at least partially in parallel to one another. Steps c) to h) take place particularly after steps a) and b).

A battery cell comprises, in particular, a housing which encloses a volume and, arranged in the volume, at least one first electrode foil of a first electrode type, one second electrode foil of a second electrode type, and one separator material interposed therebetween, as well as an electrolyte, e.g., a liquid or a solid electrolyte.

The battery cell is particularly a pouch cell (with a deformable housing consisting of a pouch film) or a prismatic cell (with a dimensionally stable housing). A pouch film is a well-known deformable housing part that is used as a housing for so-called pouch cells. It is a composite material comprising a plastic and aluminum, for example.

The battery cell is particularly a lithium-ion battery cell.

The individual foils of the plurality of electrode foils are arranged one on top of the other and particularly form a stack. The electrode foils are each associated with different electrode types, i.e., they are embodied as an anode or a cathode. Anodes and cathodes are arranged alternately and are respectively separated from one another by the separator material.

A battery cell is a power storage means that is used in a motor vehicle, for example, to store electric power. A motor vehicle, for example, has in particular an electric machine for driving the motor vehicle (a traction drive), it being possible for the electric machine to be driven by the electric power stored in the battery cell.

According to step a), an electrode foil with a surface is particularly provided. The electrode foil is provided particularly as a continuous material. In particular, the electrode foil comprises a carrier material which is particularly composed of a metallic material that is optionally and at least partially coated, e.g., with an active material. The electrode foil has two largest side surfaces with a theoretically continuous length in an x direction, a width in a y direction, and a thickness in a z direction. The extension in the z direction is the smallest. In the present case, one of the side faces of the electrode foil forms the surface.

A cutting device is provided which comprises at least one nozzle with an outlet, one cutting tool, and one vibration device. Furthermore, the outlet is arranged over the electrode foil with separation from the surface (step b)). The nozzle is used to direct the particle stream onto the surface. The particle stream exits the cutting device via the outlet of the nozzle and flows toward the surface. The nozzle is arranged with a such a separation from the surface that there is no direct mechanical contact between the nozzle and the surface. The cutting tool may include the outlet or may be positioned adjacent thereto. The cutting tool is excited to vibration by the vibration device.

In particular, the cutting tool does not contact the surface, or does not do so directly. In particular, the cutting tool contacts the surface via at least one particle that is interposed between the cutting tool and the surface. The cutting tool thus particularly contacts the particle and moves the particle as a result of the vibrations. The particle which has been excited in this manner produces the cutting effect on the electrode foil. The separation between the cutting tool and the surface can thus be bridged particularly by individual particles.

A particle feed line and a gas feed line are also provided. These feed lines are used particularly to transport the particles and a first gas stream.

According to step c), a first gas stream is particularly introduced from the gas feed line into the cutting device. According to step d), at least particles are introduced from the particle feed line into the cutting device. Furthermore, the first gas stream and at least the particles are mixed in the cutting device to form the particle stream according to step e). The first gas stream is used particularly to transport and accelerate the particles, so that they are transported together with the gas stream, i.e., as a particle stream, via the nozzle toward to the surface.

According to step f), particularly at least the cutting tool or, in addition, the nozzle is excited to vibration by the vibration device. As a result of the vibrations, at least the cutting tool moves particularly on a plane that is oriented perpendicular to the surface.

According to step g), the particle stream emerging from the outlet is particularly applied to the electrode foil, and the electrode foil is cut. The electrode foil is gradually severed by the impact of the particles on the surface. In the process, the particles are particularly hurled at the surface, whereby the material of the surface, more particularly of the electrode foil, is displaced by the particles.

According to step h), the vibrations of the cutting tool are particularly applied to the electrode foil via at least one particle that is interposed between the cutting tool and the electrode foil, whereby the electrode foil is cut.

Steps g) and h) can be set up in such a way that they, either alone or together, (at least temporarily) bring about the process of the (partial) cutting of the electrode foil.

In particular, the nozzle is an ultrasonic horn or is embodied as an ultrasonic horn, with the outlet being excited to vibration by a vibration device. As a result of the vibrations, the outlet and the cutting tool move particularly on a plane that is oriented perpendicular to the surface.

An ultrasonic horn is a tool that is caused to undergo resonance vibrations through the introduction of high-frequency mechanical vibrations (e.g., ultrasound, but also lower frequencies). An amplitude of the excitation can be increased via the ultrasonic horn.

Instead of by slitting and notching with mechanical cutting (utilizing the principle of shearing by the cutting tool) or by energy (laser), the cutting is performed here by a gas medium that is vibrating at high speed, the first gas stream, which carries abrasively acting particles along with it, and by a cutting tool that is excited to vibration. The cutting effect of the particles or, rather, of the cutting tool can be enhanced through the high-frequency excitation of the particle stream or of the cutting tool by means of the ultrasonic horn.

With the proposed method, it is particularly possible to achieve high cutting speeds. In addition, there is tool wear only on the cutting tool. Furthermore, there are no burrs on the cut edges, nor is there a heat-affected zone. The method is particularly suitable for slitting. However, it can also be used for notching and cutting.

Here the cutting is carried out by a combination of two principles: by a throwing mechanism (bombardment) on the one hand, and by the hammer effect of a "hammering" process on the other hand.

In the operating principle of the throwing mechanism, a possibly vibrating first gas stream, particularly a high-speed air jet, carries the abrasively acting particles along with it. In particular, the particles also begin to vibrate in the gas stream. Both the first gas stream and the particles are hurled against the cutting region of the surface in the form of a sharp, abrasive gas blade. The focal point of the abrasive gas blade can be very small. The cutting takes place particularly through the kinetic and possibly vibrational energy of the particles that are transported by the first gas stream.

With the operating principle used here—i.e., the hammering process—cutting is carried out by means of vibrational excitation and abrasively acting particles. An abrasive is distributed over the cutting region (here, the surface) and set in motion by a vibrating cutting tool. There is thus an interaction here between the cutting tool and the electrode foil. The cutting takes place here particularly as a result of the vibrational energy of the cutting tool and through the abrasive effect of the particles that are interposed between the cutting tool and the surface and moved by the cutting tool. The particles are transported to the cutting tool via the gas stream.

In particular, the ultrasonic horn is designed with a cavity, and the particle stream is fed via the cavity to the outlet.

In particular, the outlet of the nozzle is formed on the cutting tool. The particle stream thus emerges particularly from the outlet that is arranged at the tip of the cutting tool. The cutting tool is therefore particularly hollow and, in particular, connected to the cavity of the ultrasonic horn. The particle stream is directed via the cavity in the ultrasonic horn and the hollow cutting tool toward the surface. The tip of the cutting tool is oriented toward the surface of the electrode foil and is located closest to the surface. The cutting tool thus extends away from the surface starting from the tip.

In particular, the outlet is adjacent to the cutting tool. In particular, the particle stream is guided via the cavity of the ultrasonic horn and then transferred to a feed region that is arranged so as to be adjacent to the cutting tool. The particle stream is guided via the feed region toward the cutting region. The cutting tool is embodied particularly as a solid part, meaning that it is not hollow. The feed region is connected particularly to the ultrasonic horn and is also excited by the ultrasonic horn.

In particular, at least
  the vibration has an amplitude, particularly at the outlet, of at most 80 microns, preferably at most 60 microns or at most 50 microns; or
  the frequency of the vibration is between 5 kHz [kilohertz] and 50 kHz, preferably between 10 kHz and 25 kHz; or
  the outlet has a diameter or a maximum width of up to 1.0 millimeters, particularly from 0.2 to 0.8 millimeters, preferably from 0.4 to 0.6 millimeters.

In particular, the cutting tool has a closed tip facing toward the electrode foil with a smallest width of 0.2 to 1.5 millimeters, preferably of 0.5 to 1.2 millimeters. An open tip having the outlet has, particularly, a smallest width of at most 2 millimeters. The smallest width is particularly the smallest extension of the width. If the ultrasonic horn or the nozzle is rectangular, for instance, the tip extends parallel to the surface of the electrode foil along a length. This much greater length must not be understood as the width.

The vibration device preferably comprises a transducer (piezoelectric or magnetostrictive) to which a high-frequency electrical signal is transmitted. The transducer converts the electrical signal into low-frequency, low-frequency mechanical vibrations. Essentially, the transducer converts electric power into mechanical vibrations. This mechanical vibration is then passed on to the hollow ultrasonic horn.

The mechanical vibrations in the vicinity of the transducer have a low amplitude. The primary function of the ultrasonic horn is to amplify this vibration.

A piezoelectric transducer, or crystal, produces a small electric current when it is compressed. When electric current is passed through the crystal, it expands. When the current is removed, the crystal returns to its original size and shape. Such transducers are available up to 900 watts. Piezoelectric crystals have a high conversion efficiency of 95%. During the use of such a transducer, an electrical signal is introduced into the transducer, and the mechanical vibration generated in this manner is passed on to the ultrasonic horn.

A magnetostrictive transducer changes in length when exposed to a strong magnetic field. These transducers are made from nickel or nickel alloy sheets. Their conversion efficiency is around 20-30%. Such transducers are available up to 2000 watts. The maximum change in length that can be achieved is around 25 micrometers. During the use of such a transducer, a magnetic field is fed into the transducer, and the mechanical vibration generated in this manner is then delivered to the ultrasonic horn.

The piezoelectric transducer is preferable because of its high conversion efficiency. A low frequency of around 10 kHz and an amplitude of around 50 microns has proven to be especially suitable for cutting electrode foils. The ultrasonic horn receives an input amplitude of about 20 to 25 microns, and the output amplitude at the output is then amplified to 50 microns.

The transducer is provided particularly in the form of a ring and is arranged in the vicinity of the inlet of the ultrasonic horn. In particular, only the ultrasonic horn is excited via the transducer.

The ultrasonic horn or the nozzle is particularly made of titanium or a titanium alloy, e.g., $Ti_6Al_4V$. The cavity, which extends particularly as a channel through the ultrasonic horn or nozzle from the inlet to the outlet, is particularly made of tungsten carbide. Cavity or channel and ultrasonic horn can be designed in two parts and connected to one another by pressing.

The cavity or channel through the nozzle or ultrasonic horn extends particularly in a conical or exponential shape. In particular, the outlet has a smaller diameter than the inlet.

The particle stream can be further focused with the nozzle/ultrasonic horn so that it has a largest diameter of approximately 10% of the largest diameter of the outlet on the surface.

The calculation of the required length of an ultrasonic horn, i.e., between inlet and outlet, is one of the most important aspects of ultrasonic horn design. To minimize losses and transfer the maximum energy from the ultrasonic converter or transducer to the ultrasonic horn, the ultrasonic horn should be in resonance with the operating frequency of the transducer. The length of the ultrasonic horn, particularly up to the tip of the cutting tool, should be an odd multiple of half the wavelength of the transducer vibration (lambda/2). In particular, it should be noted that the amplitude of the vibration is at its maximum at the outlet. The node is provided particularly at the inlet of the ultrasonic horn, and the antinode is provided at the outlet or at the tip of the cutting tool.

In particular, the separation between the surface and the outlet should be a multiple of the wavelength of the vibration of the transducer. An amplitude of the vibration at the focal point of the particle stream is thus at its maximum on the surface. In particular, the inlet of the channel of the ultrasonic horn receives the amplitude from the acoustic converter.

In particular, a mixture of at least the particles and an anhydrous liquid is fed in via the particle feed line.

In particular, the liquid has a proportion of at most 25% by weight, preferably from 4 to 15% by weight, especially preferably at least 2% by weight of the mixture.

In particular, the liquid comprises a component of a carbonate-based electrolyte or a paraffin-based oil.

In particular, the liquid comprises a component of a carbonate-based electrolyte, e.g., ethylene carbonate ($C_3H_4O_3$) or diethylene carbonate ($C_5H_{10}O_3$), or a paraffin-based oil. If an electrolyte component is used as the liquid, its adhesion to the electrode foil is not harmful, not even for the subsequent operation of the battery cell produced in this manner.

In particular, ethylene carbonate can be supplemented with polypropylene carbonate, so that the liquid does not solidify even at lower temperatures.

In particular, no water is used in the proposed method to produce the mixture, unlike in the known hammering method.

The liquid can be fed to the particles in a mixing device. In particular, the liquid and the particles are mixed and then made available as a so-called "slurry," for example, for feeding to the cutting device. The mixture of particles and liquid can then be fed in via the particle feed line.

In particular, the gas stream is fed via a Venturi nozzle to the nozzle.

In particular, the gas stream comprises (exclusively) air. This is compressed particularly upstream from the gas feed line, in particular to a pressure of at least 2 bar, preferably at least 5 bar; especially preferably at most 10 bar.

A gas compressor in the form of a centrifugal compressor with a radial construction can be used for compression. Dry gas (e.g., dry air) is drawn into the center of a rotating impeller with radial blades and compressed by centrifugal force. The rotational speed of the centrifugal compressor controls the gas pressure.

The gas stream is fed via the gas feed line to the cutting device and introduced into the inlet of the Venturi nozzle (into the converging first portion).

A Venturi nozzle is inherently known. It normally comprises a converging first portion, a second portion with the smallest flow cross section, and a diverging third portion. The Venturi nozzle has an inlet upstream from the first portion and an outlet downstream from the third portion. The Venturi nozzle extends along the direction of flow over an entire length between the inlet and outlet. The individual portions each extend over a length.

A Venturi nozzle consists particularly of a smooth-walled pipe segment with a narrowing of the cross section that is achieved, for example, by two cones that are oriented toward one another and merge at the point of their smallest diameter. When a fluid flows through a Venturi nozzle, the dynamic pressure (back pressure) is at a maximum and the hydrostatic pressure is at a minimum at the narrowest point of the pipe segment.

In the first portion, the first gas stream accelerates to a high velocity (Mach numbers in the range of 0.5 to 1) while expanding in the diverging region of the nozzle. The velocity of the first gas stream at the outlet should be at a Mach number of around 0.5 to 1. The pressure at the outlet corresponds particularly to the ambient pressure.

The (dry) gas stream moves through the Venturi nozzle toward the outlet, and the pressure that is present at the inlet is converted into a higher velocity at the outlet. This accelerated gas stream is fed particularly to the inlet of the nozzle or ultrasonic horn.

In particular, the particle feed line opens out at the inlet of the Venturi nozzle, downstream from the inlet in the first portion or in the third portion. The individual streams are controlled particularly by means of valves. Particularly exclusively the particles, optionally supported by a gas stream, or the mixture comprising the particles and the liquid, can be fed in via the particle feed line.

If the particle feed line enters upstream from the second portion, at least the particles can be accelerated to the same velocity as the gas stream. However, the Venturi nozzle will have a shorter service life, because the fast-moving particles have an abrasive effect on the second portion.

If the particle feed line enters downstream from the second portion, the first gas stream has the highest velocity in the third portion. The velocity of the particles is substantially lower than in the case of a junction that is provided farther upstream. However, the Venturi nozzle has a longer service life.

In particular, the particle stream has a flow velocity of at least 0.15 Mach, preferably between 0.15 and 0.5 Mach, at least at the outlet.

In particular, aluminum oxide is used as the particle. Aluminum oxide is ceramic, is not electrically conductive, and may be present in the battery cell, for example as a coating of the separator. In addition, it has a high hardness and a high electrical resistance.

In particular, the particles have a maximum diameter of 40 microns. A quality of the cut edges produced by the cutting can be increased by smaller particles. The particles preferably have a maximum diameter of 10 to 30 microns.

In particular, the cutting device has a suction device by means of which particles rebounding at least from the surface back to the nozzle or particles that have passed through the electrode foil are sucked off. The suction device can be arranged so as to be at least partially adjacent to the nozzle or ultrasonic horn. Particles rebounding from the surface can thus be suctioned off. Alternatively or in addition, at least part of the suction device can be arranged with separation from the nozzle/ultrasonic horn through the electrode foil. The suction device can thus be arranged so as to be at least situated opposite the nozzle/ultrasonic horn, with the electrode foil being arranged in between. The particles passing through the electrode foil can then be suctioned off.

In particular, the electrode foil is guided over tension rollers and/or conveyor rollers, thereby defining the position of the electrode foil relative to the cutting device. In particular, the cutting lines extend in such a way that there is no support from a roller in this region.

The rollers can be designed with a surface structure which is such that the electrode foil is tensioned not only in the longitudinal direction (x direction), but also in the width direction (y direction).

In particular, the electrode foil can be supported by a support device, thus enabling a separation between the outlet of the nozzle/ultrasonic horn and the surface in particular to be set precisely. In particular, the suction device can be at least partially integrated in the support device, so that the suction device is situated opposite the outlet below the cutting line and particularly at all times during cutting.

In particular, the cutting device comprises a heating device by means of which the electrode foil that is acted upon by the particle stream is dried. In particular, the heating device comprises at least one infrared radiator by means of which the electrode foil can be heated, particularly to 105 to 125 degrees Celsius, preferably to approximately 120 degrees Celsius.

In particular, the liquid of the mixture can be removed from the cut edges using the heating device.

In particular, the cutting device has a cleaning device in which at least one cut edge of the electrode foil is at least mechanically contacted, e.g., by a brush or a roller, or by an ionized second gas stream from adhering particles is cleaned. The possibly statically charged particles can be neutralized by the ionized second gas stream and then easily suctioned off or blown off.

In particular, the particles can be used repeatedly. For this purpose, the particles can be collected and returned, meaning that they can be fed back into the process via the particle feed line.

A device for cutting electrode foils that are intended for use in a battery cell is also proposed. The cutting device is designed to be particularly suitable for carrying out the method described herein.

The cutting device comprises at least one nozzle with an outlet, one cutting tool, one vibration device for exciting at least the cutting tool to vibration, one particle feed line for supplying at least particles, and one gas feed line for supplying a first gas stream. The particles and the first gas stream can be mixed in the cutting device to form a particle stream and fed via the nozzle to the outlet. The cutting tool and the outlet of the nozzle are arranged above the electrode foil with separation from a surface of the electrode foil, and the electrode foil can be cut at least by the particle stream and as a result of the vibrations of the cutting tool.

In particular, a mixture of at least the particles and an anhydrous liquid is fed in via the particle feed line. The liquid serves particularly to wet the particles. The particles are more closely bound to one another as a result, and rebounding of the particles flung onto the surface can be reduced or prevented.

In particular, the nozzle is an ultrasonic horn, it being possible for the cutting tool and the outlet to be excited to vibration by a vibration device of the cutting device. As a result of the vibrations, the outlet and the cutting tool are moved particularly on a plane that is oriented perpendicular to the surface.

A battery cell is also proposed which comprises at least one housing with a stack of electrode foils arranged therein that are produced particularly by means of the method described herein and/or by the cutting device described herein.

A motor vehicle is also proposed which comprises at least one traction drive one battery having at least one of the battery cells described herein, it being possible for the traction drive to be supplied with power by the at least one battery cell.

The method can be carried out particularly by a data processing system, e.g., a control unit, the system having means which are suitably equipped, configured, or programmed to perform the steps of the method or which perform the method. With the system, it is possible to at least
- control the at least one first gas stream;
- control the at least one particle stream;
- control the cutting speed;
- control the velocity of the particle stream; and/or
- control the vibration device.

The cutting device particularly comprises the system described above.

The means comprise, for example, a processor and a memory in which instructions to be executed by the processor are stored, as well as data lines or transmission devices which enable instructions, measured values, data, or the like to be transmitted between the listed elements.

A computer program is also proposed that comprises instructions which, when the program is executed by a computer, cause the computer to carry out the method described herein or, rather, the steps of the method described herein.

A computer-readable storage medium is also proposed that comprises instructions which, when executed by a computer, cause the computer to carry out the method described herein or, rather, the steps of the method described herein.

Remarks concerning the method can be applied particularly to the cutting device, the battery cell, the motor vehicle, the data processing system, and to the computer-implemented method (i.e., the computer or processor and the computer-readable storage medium), and vice versa.

The following advantages are achieved:
- In particular, the proposed cutting of an electrode foil with particles makes burr-free cutting possible;
- It does not create a heat-affected zone like laser cutting;
- An electrolyte component, e.g., ethylene carbonate (EC), can be used as the liquid for the mixture; that is, even if ethylene carbonate is present on the cut edge after drying, it is not harmful;
- In particular, alumina is suggested as the particle(s); it is not an electrical conductor and therefore does not create a short circuit if particles remain on the cut edge;
- A dimethylene carbonate, optionally with additives, or a paraffin-based oil can be used instead of ethylene carbonate; paraffin oil can be mixed with alcohol for quick evaporation; all of the paraffin-based oil can be vaporized using the heating device;
- Ultrasonic horn and Venturi nozzle can be integrated; this assembly imparts high velocity and vibration to the particles; it can be provided as a very compact assembly; the Venturi nozzle can be placed at the inlet of the nozzle/ultrasonic horn; it is possible to manufacture Venturi nozzle and ultrasonic horn as a single assembly from tungsten carbide; if necessary, the Venturi nozzle can be attached to the inlet of the ultrasonic horn with a screw and a vibration-damping membrane; this allows for good flexibility when attaching the Venturi nozzle and ultrasonic horn; the Venturi nozzle is not excited by the ultrasonic horn;
- No particle is able to stick to the cut edge, because the high-velocity gas stream performs edge cleaning; further cleaning of the cut edges and of the surface can be carried out before winding;
- The method can be carried out at a very high cutting speed of approximately 150 m/min;
- Tool wear occurs only on the cutting tool, which is easy to exchange; for this reason, the method is very economical;
- No gas is generated, unlike with laser cutting; as a result, no complex gas extraction is required; there is also no need to cool the electrode foil in order to reduce the heat-affected zone;
- The method can be used both for slitting and for notching and cutting;
- A very thin cut edge is produced, because fine particles with a maximum diameter approximately 25 microns can be used, and the amplitude of the vibration of the outlet can be adjusted to about 50 microns;
- By reducing velocity and vibration, different electrode foil materials can be cut with the same cutting device;
- Less floor space is required, since cutting, drying, and cleaning can be integrated into a single machine, the cutting device;
- The method is economical, because the particles can be reused multiple times;
- The required pressure for the first gas stream can be 6 bar, which is generally available in the industry; there is therefore no need to provide high-pressure dry air;
- The ultrasonic horn has two primary functions: it amplifies the amplitude of the vibration and reduces the diameter of the particle stream hitting the surface; in this way, a sharp and small focus can be provided, and the ultrasonic horn imparts a large amplitude to the particles, thereby enhancing the cutting effect of the particles;
- The ultrasonic horn is easy to manufacture; an inner channel of the ultrasonic horn, which comes into contact with the particles, can be made of tungsten carbide; this enables the ultrasonic horn to have good wear resistance and a long service life;
- More cutting energy can be generated through the combination of the vibration of the cutting tool and the kinetic energy of the particle stream, for example in order to cut hard ceramic coatings;
- By virtue of the combination of the operating principles (throwing mechanism and hammer effect), a rebounding of the particles off the surface of the electrode foil can be prevented, which means that no additional arrangement for catching or suctioning off the rebounded particles is required;
- A cylindrical ultrasonic horn with a correspondingly cylindrical or conical cutting tool is used particularly for the slitting.
- A rectangular ultrasonic horn with a correspondingly rectangular cutting tool is used particularly for notching and cutting;
- If a solid cutting tool is used, the gas stream and the particles are directed toward the surface through a feed region that is arranged so as to be adjacent to the cutting tool; the cutting tool and the ultrasonic horn are connected particularly by means of a slide mechanism; ultrasonic horn and feed region are connected particularly by screws and, if necessary, nuts;
- In the variant with a solid cutting tool, the hammering method is the more dominant cutting mechanism;
- If a hollow cutting tool is used, a feed region is particularly not provided; cutting tool and ultrasonic horn are connected particularly by means of a slide mechanism; the particle stream exits via the outlet formed on the cutting tool;
- In the variant with the hollow cutting tool, the throwing mechanism is the more dominant cutting mechanism.

Particularly in the claims and in the description that describes them, the indefinite articles ("a" and "an") are to be understood as such and not as quantifiers. Accordingly, terms and components that are introduced therewith are thus to be understood as being present at least singly but particularly also possibly in a plurality.

By way of precaution, it should be noted that the number words used here ("first," "second," . . . ) serve primarily (only) to distinguish a plurality of similar objects, quantities, or processes; that is, they do not prescribe any dependency and/or order of these objects, quantities, or processes relative to one another. Should a dependency and/or order be required, this is explicitly stated herein or it obviously follows for a person skilled in the art when studying the embodiment specifically described. If a component can occur multiple times ("at least one"), the description of one of these components can apply equally to all or a portion of the plurality of these components, but this is not necessarily the case.

BRIEF DESCRIPTION OF THE DRAWINGS

The invention and the technical environment will be explained in greater detail with reference to the enclosed figures. It should be noted that the invention is not intended to be limited by the specified embodiments. In particular, unless explicitly stated otherwise, it is also possible to extract partial aspects of the features explained in the figures and to combine them with other components and insights from the present description. In particular, it should be pointed out that the figures and, in particular, the illustrated proportions are only schematic. In the drawings.

DETAILED DESCRIPTION OF THE INVENTION

Figure 1:
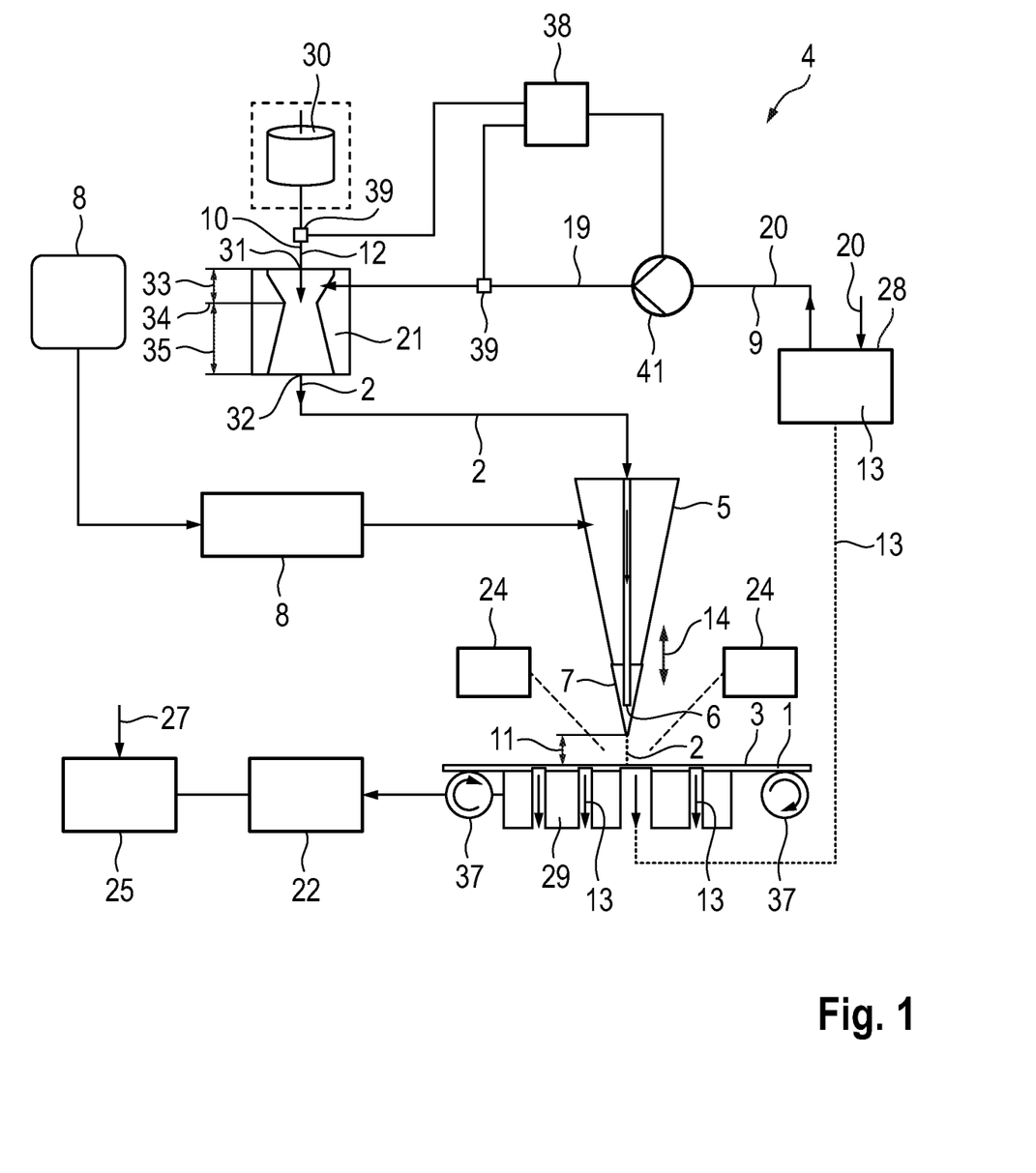
FIG. 1 shows a cutting device for carrying out the method.

FIG. 1 shows a cutting device 4 for carrying out the method. The cutting device 4 comprises a nozzle 5 with an outlet 6, a cutting tool 7, a vibrating device 8, a particle feed line 9 for supplying at least particles 13, and a gas feed line 10 for supplying a first gas stream 12. The particles 13 and the first gas stream 12 are mixed in the cutting device 4 to form a particle stream 2 and fed via the nozzle 5 to the outlet 6. The outlet 6 is arranged above the electrode foil 1 with separation 11 from a surface 3 of the electrode foil 1, and the electrode foil 1 is cut inter alia as a result of the particle stream 2.

According to step a), an electrode foil 1 with a surface 3 is provided. The electrode foil 1 is provided as a continuous material. The electrode foil has two largest side surfaces with a theoretically continuous length in an x direction, a width in a y direction, and a thickness in a z direction. The extension in the z direction is the smallest. In the present case, one of the side surfaces of the electrode foil 1 forms the surface 3.

Furthermore, a cutting device 4 is provided which comprises a nozzle 5 with an outlet 6, and the outlet 6 is arranged above the electrode foil 1 with separation 11 from the surface 3 (step b)). The nozzle 5 is used to direct the particle stream 2 onto the surface 3. The particle stream 2 emerges from the cutting device 4 via the outlet 6 of the nozzle 5 and flows toward the surface 3. The nozzle 5 is arranged with such a separation 11 from the surface 3 that there is no direct mechanical contact between the nozzle 5 and the surface 3. The cutting tool 7 can have the outlet 6, or the outlet 6 can be arranged so as to be adjacent to the cutting tool 7. The cutting tool 7 is excited to vibration 14 by the vibration device 8.

The cutting tool 7 contacts the surface 3 via at least one particle 13 that is interposed between the cutting tool 7 and the surface 3. The cutting tool 7 thus contacts the particle 13 and moves the particle 13 as a result of the vibrations 14. The particle 13 which has been excited in this manner produces the cutting effect on the electrode foil 1. The separation 11 between the cutting tool 7 and the surface 3 can thus be bridged by individual particles 13.

In addition, a particle feed line 9 and a gas feed line 10 are provided. These feed lines 9, 10 are used to transport the particles 13 and a first gas stream 12.

According to step c), a first gas stream 12 introduced particularly from the gas feed line 10 into the cutting device 4. According to step d), at least particles 13 are introduced from the particle feed line 9 into the cutting device 4. Furthermore, the first gas stream 12 and at least the particle 13 are mixed in the cutting device 4 to form the particle stream 2 according to step e). The first gas stream 12 is used to transport and accelerate the particles 13 so that they are transported together with the gas stream 12, i.e., as a particle stream 2, via the nozzle 5 to the surface 3.

According to step f), the cutting tool 7 and the nozzle 5 are excited to vibration 14 by the vibration device 8. As a result of the vibrations 14, the cutting tool 7 and the outlet 6 move on a plane that is oriented 3 perpendicular to the surface.

According to step g), the particle stream 2 emerging from the outlet 6 is applied to the electrode foil 1, and the electrode foil 1 is cut. The electrode foil 1 is gradually severed by the impact of the particles 13 on the surface 3. The particles 13 are thrown against the surface 3, whereby the material of the surface 3 or of the electrode foil 1 is displaced by the particles 13.

According to step h), the vibrations 14 of the cutting tool 7 are applied to the electrode foil 1 via at least one particle 13 that is interposed between the cutting tool 7 and the electrode foil 1, whereby the electrode foil 1 is cut.

The nozzle 5 is an ultrasonic horn or is embodied as an ultrasonic horn, with the outlet 6 and the cutting tool 7 being excited by a vibration device 8. The ultrasonic horn is embodied as a hollow nozzle 5.

Starting from a mixing device 28, a mixture 19 of the particles 13 and an anhydrous liquid 20 is fed in via a pump 41 through the particle feed line 9.

The first gas stream 12 is fed via a Venturi nozzle 21 to the nozzle 5. For this purpose, the first gas stream 12 is compressed upstream from the gas feed line 10. A compressor 30, e.g., a gas compressor in the form of a centrifugal compressor with a radial construction, is used for the compression. The first gas stream 12 is fed via the gas feed line 10 to the cutting device 4 and introduced into the inlet 31 of the Venturi nozzle 21 in the converging first portion 33.

A Venturi nozzle 21 comprises a converging first portion 33, a second portion 34 with a smallest flow cross section, and a diverging third portion 35. The Venturi nozzle 21 has an inlet 31 upstream from the first portion 33 and an outlet 32 downstream from the third portion 35. The Venturi nozzle 21 extends between the inlet 31 and the outlet 32 along the direction of flow over an entire length.

The (dry) first gas stream 12 moves through the Venturi nozzle 21 toward the outlet 32, the pressure that is present at the inlet 31 being converted to a higher velocity at the outlet 32. This accelerated first gas stream 12 is fed to the inlet 36 of the nozzle 5 or ultrasonic horn.

The particle feed line 9 enters downstream from the inlet 31 in the first portion 33. If the particle feed line 9 enters upstream from the second portion 34, the particles 13 can be accelerated to the same velocity as the first gas stream 12.

The individual flows, i.e., the first gas stream 12 and the flow of the mixture 19, are controlled by means of valves 39.

The cutting device 4 has a suction device 24 by means of which particles 13 rebounding from the surface 3 back the nozzle 5 and particles 13 having passed through the electrode foil 1 are suctioned off. The suction device 24 is partially adjacent to the nozzle 5 or ultrasonic horn. Particles 13 rebounding from the surface 3 can thus be suctioned off. In addition, part of the suction device 24 is arranged with separation from the nozzle 5 through the electrode foil 1. The suction device 24 is thus also arranged so as to be situated opposite the nozzle 5, with the electrode foil 1 being arranged in between. The particles 13 passing through the electrode foil 1 can then be suctioned off.

The electrode foil 1 is guided over tension rollers 37 and conveyor rollers 37, thereby defining the position of the electrode foil 1 relative to the cutting device 4. The cutting lines extend in such a way that there is no support from a roller 37 in this region.

The electrode foil can be supported by a support device 29, thus enabling a separation 11 between the outlet 6 of the nozzle 5 and the surface 3 to be set 6 precisely. The suction device 24 is at least partially integrated into the support device 29, so that the suction device 24 is situated opposite the outlet 6 below the cutting line and at all times during cutting.

The cutting device 4 comprises a heating device 22 by means of which the electrode foil 1 that is acted upon by the particle stream 2 is dried. The liquid 20 of the mixture 19 can be removed from the cut edges 26 using the heating device 22 (see FIG. 4).

The cutting device 4 has a cleaning device 25 in which the cut edges 26 of the electrode foil 1 are cleaned by a mechanical contact, e.g., by a brush or a roller, or by an ionized second gas stream 27 of adhering particles 13. The possibly statically charged particles 13 can be neutralized by the ionized second gas stream 27 and then suctioned off or blown off more easily.

The particles 13 are used repeatedly. For this purpose, the particles 13 are collected at least via the suction device 24 and returned to a mixing device 28 for the mixture 19 so that they can be fed via the particle feed line 5 back to the Venturi nozzle 21.

Certain parts of the cutting device 4 could be controlled via a control unit 38.

Figure 2:
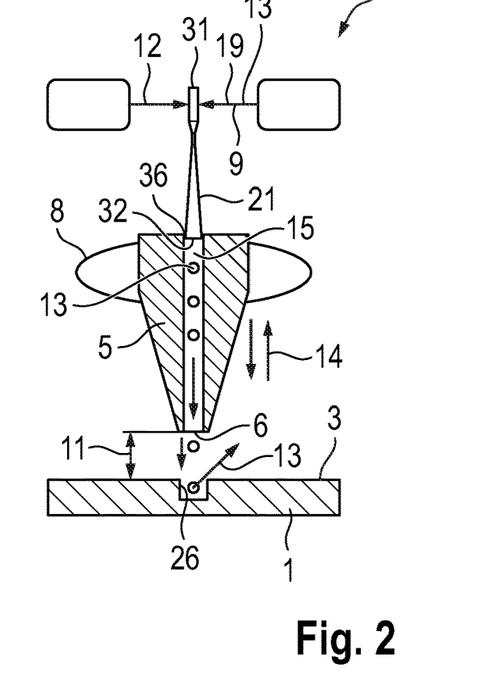
FIG. 2 shows a first operating principle of a cutting device.

FIG. 2 shows a first operating principle of a cutting device 4. Reference is made to the remarks in relation to FIG. 1.

According to the first operating principle, the throwing mechanism, the possibly vibrating first gas stream 12 carries the abrasively acting particles 13 along with it. The particle stream 2 flows through the cavity 15 of the nozzle 5, which is embodied as an ultrasonic horn, and is excited by the vibrations 14 of the excited ultrasonic horn. The particles 13 begin to vibrate in the first gas stream 12. Both the first gas stream 12 and the particles 13 are hurled against the cutting region of the surface 3 in the form of a sharp abrasive gas blade. The focal point of the abrasive gas blade can be very small. The cutting takes place through the kinetic and possibly vibrational energy of the particles 13 that are transported by the first gas stream 12.

Figure 3:
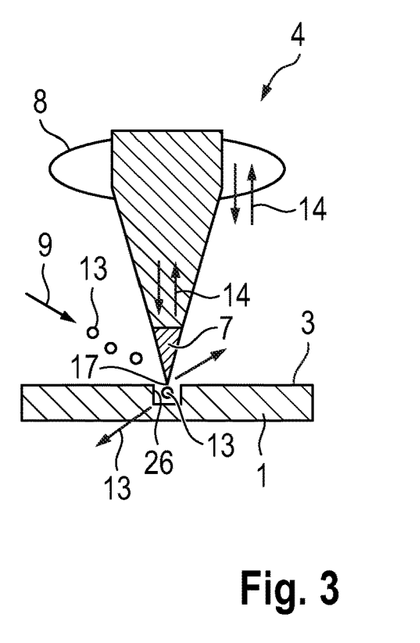
FIG. 3 shows a second operating principle of a cutting device.

FIG. 3 shows a second operating principle of a cutting device 4. Reference is made to the remarks in relation to FIGS. 1 and 2.

With the second operating principle, the hammering process, cutting is carried out by means of vibrational excitation and abrasively acting particles 13. An abrasive is distributed over the cutting region (here, the surface 3) and caused to vibrate 14 by a vibrating cutting tool 7. There is thus an interaction here between the cutting tool 7 and the electrode foil 1. The cutting occurs as a result of the vibrational energy of the cutting tool 7 and through the abrasive effect of the particles 13 that are interposed between the cutting tool 7 and the surface 3 and moved by the cutting tool 7.

Figure 4:
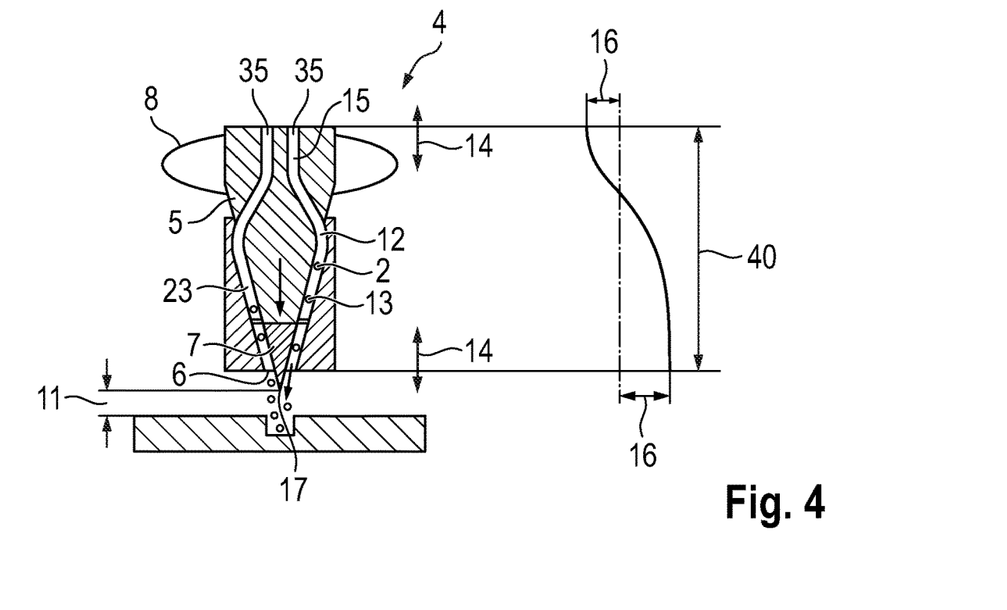
FIG. 4 shows a first design variant of the cutting device according to FIG. 1.
Figure 5:
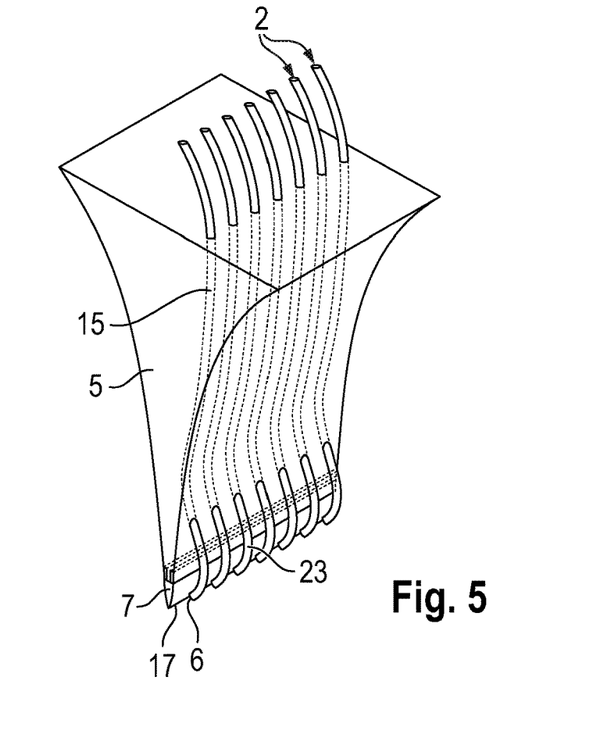
FIG. 5 shows a portion of the cutting device according to FIG. 4 in a perspective view.
Figure 6:
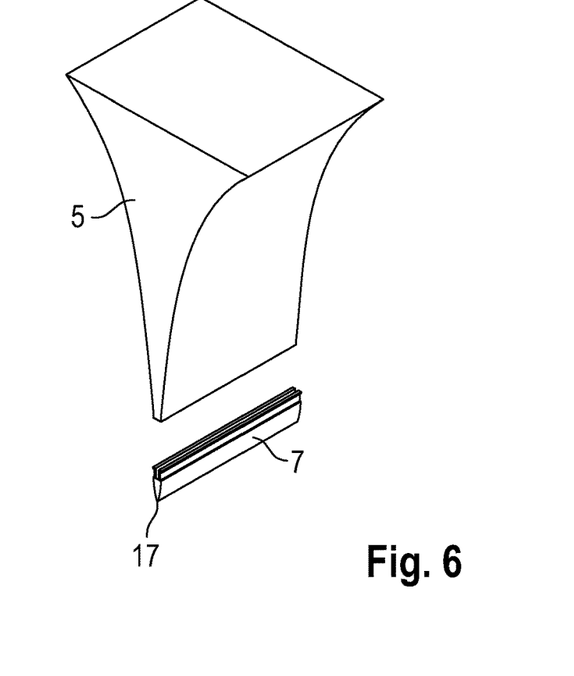
FIG. 6 shows an ultrasonic horn and cutting tool of the cutting device according to FIGS. 4 and 5 in a perspective view.

FIG. 4 shows a first design variant of the cutting device 4 according to FIG. 1. FIG. 5 shows a portion of the cutting device 4 according to FIG. 4 in a perspective view. FIG. 6 shows an ultrasonic horn and cutting tool 7 of the cutting device 4 according to FIGS. 4 and 5 in a perspective view. FIGS. 4 to 6 are described together below. Reference is made to the remarks in relation to FIGS. 1 to 3.

The nozzle 5 is an ultrasonic horn or is embodied as an ultrasonic horn, with the outlet 6 and the cutting tool 7 being excited by a vibration device 8. The ultrasonic horn is embodied as a hollow nozzle 5. The outlet 6 is adjacent to the cutting tool 7. The particle stream 2 is guided via the cavity 15 of the ultrasonic horn and then transferred to a feed region 23, which is arranged so as to be adjacent to the cutting tool 7. The particle stream 2 is guided via the feed region 23 to the cutting region. The cutting tool 7 is embodied as a solid part, meaning that it is not hollow. The feed region 23 is connected to the ultrasonic horn and also excited by the same.

The cavity 15 of the ultrasonic horn is formed by a plurality of channels via which the first gas stream 12 and the particles 13 can be fed together as a particle stream 2 to the cutting region.

The ultrasonic horn is rectangular, with the cutting tool 7 also being rectangular as a solid part. The cutting tool 7 and the ultrasonic horn 33 can be connected to one another by means of a slide mechanism. The cutting tool 7 has a closed tip 17 that faces toward the electrode foil 1.

The vibration device 8 comprises a transducer (piezoelectric or magnetostrictive) to which a high-frequency electrical signal is transmitted. The transducer converts the electrical signal into low-frequency mechanical vibrations 14 with a low amplitude 16. Essentially, the transducer converts electric power into mechanical vibrations 14. This mechanical vibration 14 is then passed on to the hollow ultrasonic horn.

The mechanical vibrations in the vicinity of the transducer have a low amplitude 16 (see representation in the diagram on the right-hand side). The primary function of the ultrasonic horn is to amplify this vibration 14.

The (sound) transducer is provided in the form of a ring and arranged in the vicinity of the inlet 36 of the nozzle or ultrasonic horn. Only the ultrasonic horn is excited via the transducer. The inlet 36 of the nozzle 5 or cavity 15 of the ultrasonic horn thus receives the amplitude 16 from the sound transducer of the vibration device 8.

The calculation of the required length 40 of an ultrasonic horn, i.e., between inlet 36 and outlet 6, is one of the most important aspects of the ultrasonic horn design. In order to minimize losses and transfer the maximum energy from the ultrasonic transducer or transducer to the ultrasonic horn, the ultrasonic horn should be in resonance with the operating frequency of the transducer of the vibration device 8. The length 40 of the ultrasonic horn should be an odd multiple of half the wavelength of the vibration 14 of the transducer (lambda/2). The length 40 is adjusted such that the amplitude 16 of the vibration 14 is at its maximum at the outlet 6 or at the tip 17 of the cutting tool 7, meaning that the antinode of the vibration 14 should be present there. The node of the vibration 14 is located at the inlet 36.

In particular, the separation 11 between the surface 3 and the outlet 6 should be a multiple of the wavelength of the vibration 14 of the transducer. An amplitude 16 of the vibration 14 at the focal point of the particle stream 2 is thus at its maximum on the surface 3.

Figure 7:
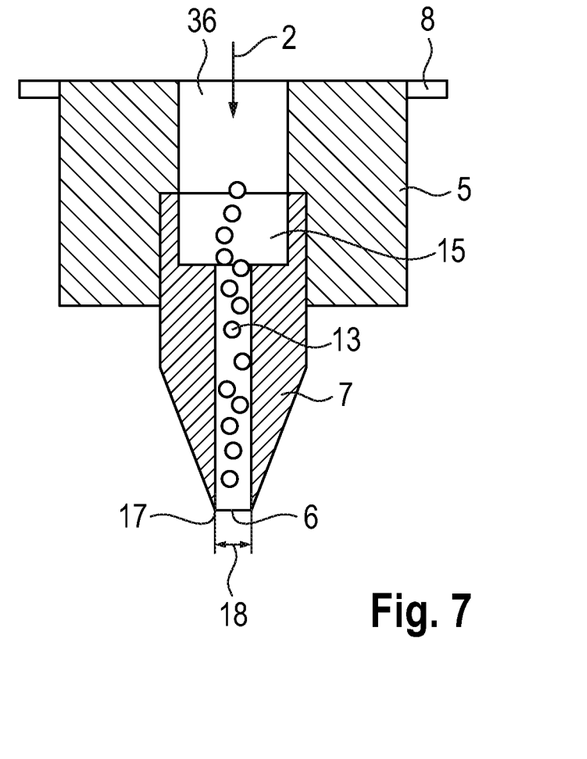
FIG. 7 shows a second design variant of the cutting device according to FIG. 1.
Figure 8:
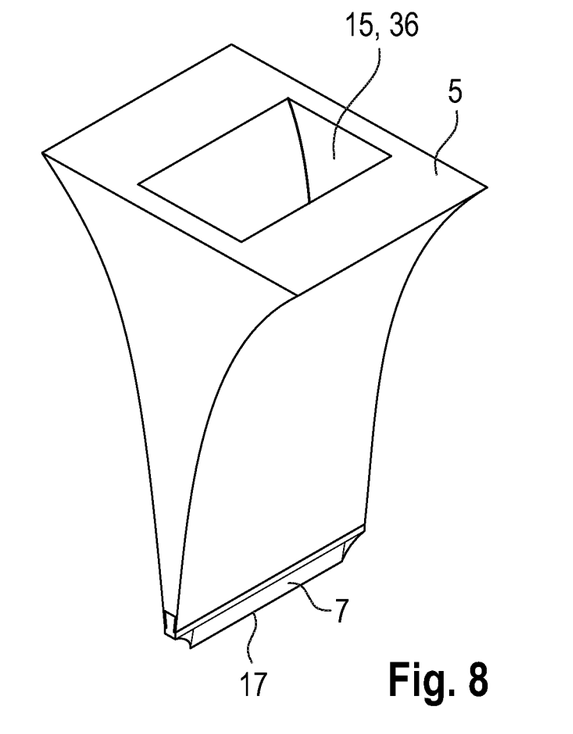
FIG. 8 shows a rectangular ultrasonic horn and cutting tool of the cutting device according to FIG. 7 in a perspective view.
Figure 9:
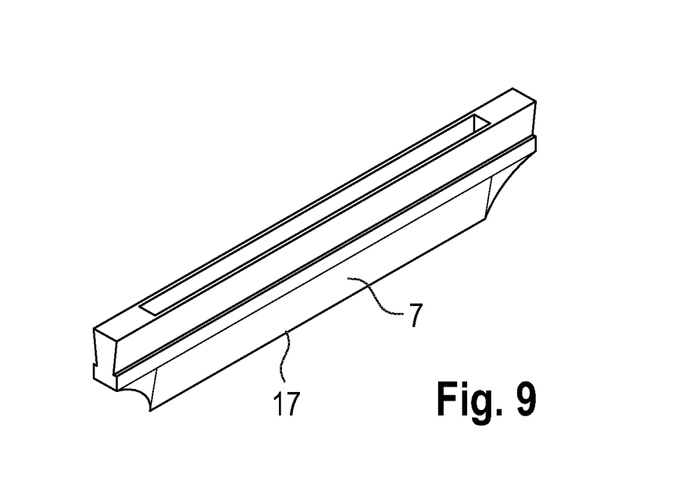
FIG. 9 shows a cutting tool of the cutting device according to FIGS. 7 and 8.

FIG. 7 shows a second design variant of the cutting device 4 according to FIG. 1. FIG. 8 shows a rectangular ultrasonic horn and cutting tool 7 of the cutting device 4 according to FIG. 7 in a perspective view. FIG. 9 shows a cutting tool 7 of the cutting device 4 according to FIGS. 7 and 8. FIGS. 7 to 9 are described together below. Reference is made to the remarks in relation to FIGS. 1 to 6.

The nozzle 5 is an ultrasonic horn or is embodied as an ultrasonic horn, with the outlet 6 and the cutting tool 7 being excited by a vibration device 8. The ultrasonic horn is embodied as a hollow nozzle 5. The outlet 6 of the nozzle 5 is formed on the cutting tool 7. The particle stream 2 emerges from the outlet 6, which is arranged at the tip 17 of the cutting tool 7. The tip 17 has a width 18. The cutting tool 7 is hollow and connected to the cavity 15 of the ultrasonic horn. The particle stream 2 is directed via the cavity 15 in the ultrasonic horn and the hollow cutting tool 7 toward the surface 3. The tip 17 of the cutting tool 7 is oriented toward the surface 3 of the electrode foil 1 and is arranged closest to the surface 3. The cutting tool 7 extends from the tip 17 away from the surface 3.

The ultrasonic horn is rectangular, and the cutting tool 7 is rectangular as well. The cutting tool 7 and the ultrasonic horn 33 can be connected to one another by means of a slide mechanism.

Figure 10:
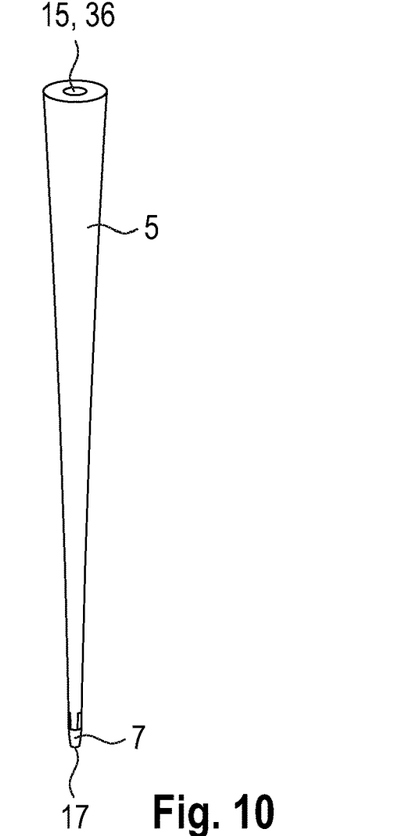
FIG. 10 shows a cylindrical ultrasonic horn and cutting tool of the cutting device according to FIG. 7 in a perspective view.
Figure 11:
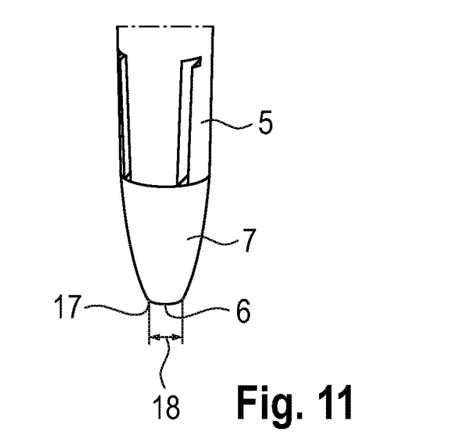
FIG. 11 shows detail from FIG. 10.

FIG. 10 shows a cylindrical ultrasonic horn and cutting tool 7 of the cutting device 4 according to FIG. 7 in a perspective view. FIG. 11 shows detail from FIG. 10. FIGS. 10 and 11 are described together below. Reference is made to the remarks in relation to FIGS. 7 to 9.

Here, the ultrasonic horn and the cutting tool 7 have a cylindrical or conical design. The cutting tool 7 and the ultrasonic horn 33 can be connected to one another by means of a slide mechanism. The cutting tool 7 is hollow and connected to the cavity 15 of the ultrasonic horn.

LIST OF REFERENCE SYMBOLS 1 electrode foil
2 particle stream
3 surface
4 cutting device
5 nozzle
6 outlet
7 cutting tool
8 vibration device
9 particle feed line
10 gas feed line
11 separation
12 first gas stream
13 particles
14 vibration
15 cavity
16 amplitude
17 tip
18 width
19 mixture
20 liquid
21 Venturi nozzle
22 heating device
23 feed region
24 suction device
25 cleaning device
26 cut edge
27 second gas stream
28 mixing device
29 support device
30 compressor
31 inlet
32 outlet
33 first portion
34 second portion
35 third portion
36 inlet
37 rollers
38 control unit
39 valve
40 length
41 pump

The invention claimed is:

1. A method for cutting electrode foils that are intended for use in a battery cell, wherein the method is carried out with a cutting device which comprises a nozzle with an outlet, a cutting device, a vibration device, a particle feed line, and a gas feed line, and comprises the following steps:
   a) providing an electrode foil with a surface;
   b) arranging the cutting tool and outlet over the electrode foil with a separation from the surface;
   c) introducing a first gas stream from the gas feed line into the cutting device;
   d) introducing particles from the particle feed line into the cutting device;
   e) mixing the first gas stream and at least the particles in the cutting device to form the particle stream;
   f) exciting at least the cutting tool or, additionally, the nozzle to vibration by means of the vibration device;
   g) applying the particle stream emerging from the outlet to the electrode foil; and
   h) applying the vibrations of the cutting tool to the electrode foil via at least one particle that is interposed between the cutting tool and the electrode foil, whereby the electrode foil is cut.

2. The method as set forth in claim 1, further comprising providing the nozzle as an ultrasonic horn, and exciting the outlet to vibration by the vibration device.

3. The method as set forth in claim 2, further comprising providing the ultrasonic horn with a cavity, and feeding the particle stream via the cavity to the outlet.

4. The method as set forth in claim 2, further comprising forming the outlet on the cutting tool.

5. The method as set forth in claim 2, further comprising forming the outlet so as to be adjacent to the cutting tool.

6. The method as set forth in claim 1, wherein the step of exciting the cutting tool to vibration comprises vibrating the cutting tool at an amplitude of at most 80 micrometers or at a frequency of between 5 kHz and 50 kHz.

7. The method as set forth in claim 1, further comprising providing the cutting tool with a closed tip facing toward the electrode foil with a smallest width of 0.2 to 1.5 millimeters.

8. The method as set forth in claim 1, wherein the step of introducing particles from the particle feed line into the cutting device comprises feeding a mixture of at least the particles and an anhydrous liquid via the particle feed line.

9. The method as set forth in claim 8, wherein the anhydrous liquid in the mixture has a proportion of at most 25% by weight of the mixture.

10. The method as set forth in claim 8, wherein the anhydrous liquid in the mixture has a component of a carbonate-based electrolyte or paraffin-based oil.

11. The method as set forth in claim 1, wherein the step of introducing a first gas stream from the gas feed line into the cutting device comprises introducing the first gas stream via a Venturi nozzle to the nozzle.

12. The method as set forth in claim 1, wherein the step of mixing the first gas stream and at least the particles in the cutting device to form the particle stream comprises forming the particle stream with a flow velocity of at least 0.15 Mach at least at the outlet.

13. The method as set forth in claim 1,
wherein the cutting device comprises a heating device,
further comprising using the heating device to dry the electrode foil that is acted upon by the particle stream.

14. A cutting device for cutting electrode foils that are intended for use in a battery cell, comprising:
a nozzle with an outlet, wherein the cutting tool and the outlet are positioned above the electrode foil with a separation from a surface of the electrode foil,
a cutting tool,
a vibration device for exciting at least the cutting tool to vibration,
a particle feed line for supplying particles, and
a gas feed line for supplying a first gas stream,
wherein the particles and the first gas stream are mixed in the cutting device to form a particle stream and fed via the nozzle to the outlet,
and
wherein the device is configured to cut the electrode foil as a result of the particle stream and the vibrations of the cutting tool that are transmitted to at least one particle that is interposed between the cutting tool and the electrode foil.

* * * * *